(12) United States Patent
Gourio

(10) Patent No.: US 6,334,382 B2
(45) Date of Patent: *Jan. 1, 2002

(54) ARMORED GLAZING, IN PARTICULAR FOR VEHICLE FIXED OR MOBILE SIDE GLAZING

(75) Inventor: Noel Gourio, Orleans (FR)

(73) Assignee: Saint-Gobain Vitrage, Courbevoie (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,696

(22) PCT Filed: Jun. 17, 1998

(86) PCT No.: PCT/FR98/01269
§ 371 Date: May 3, 1999
§ 102(e) Date: May 3, 1999

(87) PCT Pub. No.: WO98/57805
PCT Pub. Date: Dec. 23, 1998

(30) Foreign Application Priority Data

Jun. 18, 1997 (FR) .............................. 97 07561

(51) Int. Cl.$^7$ ................................................. F41H 5/04
(52) U.S. Cl. ...................................... 89/36.02; 428/911
(58) Field of Search .......................... 89/36.02; 428/911

(56) References Cited

U.S. PATENT DOCUMENTS

| | | | | | |
|---|---|---|---|---|---|
| 2,991,209 | A | * | 7/1961 | Worrall | 154/52.5 |
| 3,624,238 | A | * | 11/1971 | Kenzie | 161/183 |
| 3,671,370 | A | * | 6/1972 | Littell, Jr. | 89/36.02 |
| 4,243,719 | A | * | 1/1981 | Holmes | 428/442 |
| 4,321,777 | A | * | 3/1982 | Sauret et al. | 428/911 |
| 4,368,226 | A | * | 1/1983 | Mucaria | 428/34 |
| 4,595,624 | A | * | 6/1986 | Greathead | 428/911 |
| 4,774,143 | A | * | 9/1988 | Gondela et al. | 428/442 |
| 5,368,904 | A | * | 11/1994 | Stephinson | 428/911 |
| 5,585,188 | A | * | 12/1996 | Cheron et al. | 428/426 |

* cited by examiner

Primary Examiner—Stephen M. Johnson
(74) Attorney, Agent, or Firm—Oblon, Spivak, McClelland, Maier & Neustadt, P.C.

(57) ABSTRACT

The invention concerns an armoured laminated bullet-proof and/or splinter-proof glazing, comprising on at least part of its periphery, one or several rigid protuberances (3), each of which belonging substantially to a plane parallel to that of the window or its extension, and having a thickness for its being inserted at least partially, temporarily or permanently, in the window aperture rabbet.

4 Claims, 1 Drawing Sheet

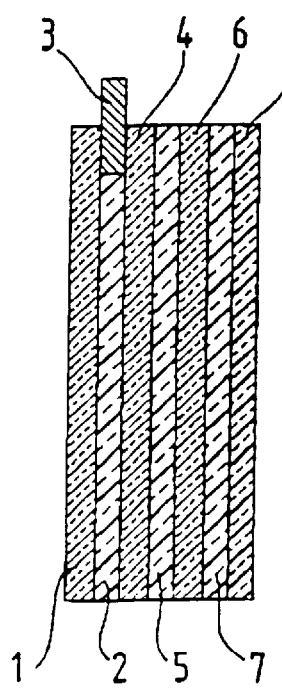
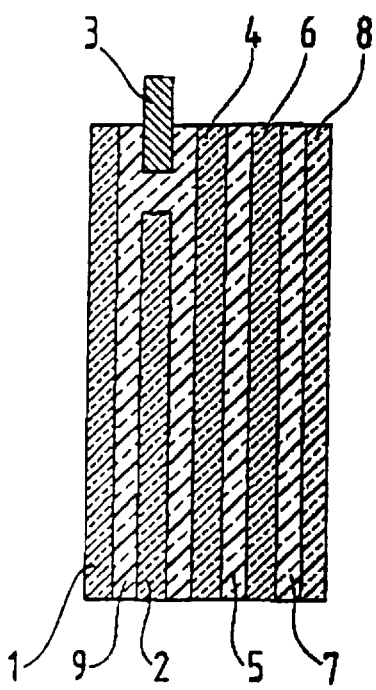
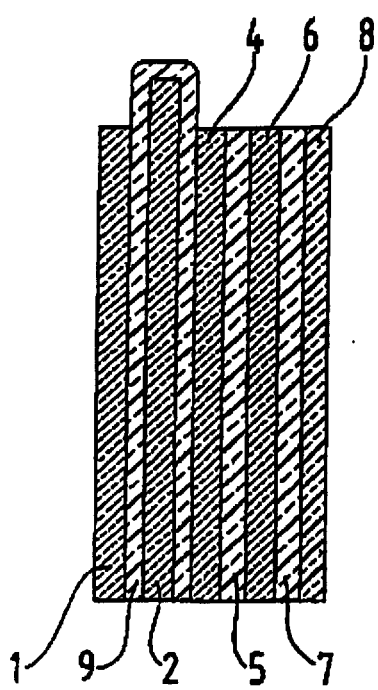
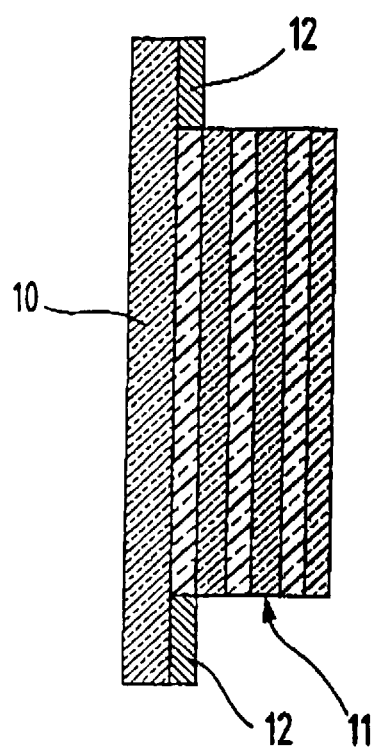

ARMORED GLAZING, IN PARTICULAR FOR VEHICLE FIXED OR MOBILE SIDE GLAZING

BACKGROUND OF THE INVENTION

1. Field of the Invention

This invention relates to a laminated, armored, bulletproof and/or shatterproof glass partition, which may be utilized for the protection of buildings or armored vehicles such as private vehicles, military vehicles or vehicles for the transport of cash. This type of glass partition is capable of being installed on vehicles for road, rail, marine or air transport.

2. Description of the Background

Considerable efforts have been made with a view to improving the resistance of armored glass partitions, in particular with respect to increasingly heavy bullets and increasingly powerful and concentrated impacts on a weak surface.

Several approaches occurred to inventors for improving the ballistic performances of these glass partitions.

In particular, some solutions have been proposed to improve the fastening of aircraft windshields. These do not have to withstand impacts of bullets, but only birds which may collide with them, and accordingly have a structure differing in the nature of the components of the laminate and more delicate than that of the armored glass partition now under consideration.

Thus, the patent U.S. Pat. No. 3,953,630 describes an aircraft windshield comprising a flexible insert with high mechanical resistance, composed of a strip of fabric of glass fibers impregnated with rubber, or even polyester fibers or stainless steel wires. This insert extends beyond the periphery of the windshield and its emerging end is made rigid so as to be bolted to the body of the aircraft.

The application FR-A1-2 612 174 relates to an aircraft windshield composed of two polycarbonate sheets with a soft interpolated polyurethane layer sandwiched between them. Because of the low rigidity of the whole thus constituted, it is not possible to contemplate an assembly identical to that of a glass windshield, by mere clamping in the fillister, without risking an ejection of the windshield due to substantial deformations of the polycarbonate. The document nonetheless makes such an assembly possible, by proposing to countersink in the periphery of the interpolated layer a rigid belt, of metal for example, on a level with the edge of the windshield.

SUMMARY OF THE INVENTION

A comparable rigid belt, intended for a glass partition for a pressurized aircraft cockpit, comprising two sheets of glass and an interpolated plastic layer, also is disclosed by patent application FR-A1-2 720 029. This belt, also countersunk in the periphery of the interpolated layer, extends beyond the periphery of the glass partition only possibly to cover the edge thereof partially or completely, the belt then having a corresponding L, respectively T profile.

BRIEF DESCRIPTION OF THE DRAWINGS

FIG. 1 illustrates a glass partition of the present invention wherein insert 3 is positioned as an extension of layer 2.

FIG. 2 is a variant of FIG. 1, wherein insert 3 is positioned as an extension of layer 2, and emerges from the laminated structure.

FIG. 3 is another embodiment wherein layer 2 has an area which is in excess of all other layers making up the glass partition, and emerges from the laminated structure.

FIG. 4 illustrates another embodiment of a glass partition made up of an outer sheet 10 and an inner stack of sheets 11.

DETAILED DESCRIPTION OF THE PREFERRED EMBODIMENT

According to another approach, the patent U.S. Pat. No. 2,991,207 describes an aircraft windshield with improved resistance to impacts of birds composed of two sheets of glass and one soft interpolated polyvinylbutyral layer. The latter extends beyond the periphery of the sheets of glass; a reinforcement piece, countersunk in the soft layer, extends from the emerging edge thereof to the interior of the laminate, that is, between the sheets of glass.

Surprisingly, the inventors became aware that the transposition to the armored glass partitions of the techniques described previously relating to the aircraft windshields, under the specific conditions of the invention such as defined below, was capable of improving their resistance to impacts of bullets or other projectiles from firearms and ensuring their holding in the fillisters after the first impact.

This objective was able to be achieved by the invention which has as its subject a laminated, armored, bulletproof and/or shatterproof glass partition comprising, over at least a portion of its periphery, one or several rigid protuberances, each of them being perceptibly inscribed in a plane parallel to that of the glass partition or its extension and having at least one peripheral portion with a thickness less than or equal to that of the fillister of the opening for the glass partition, so as to be able to be inserted therein.

Said rigid protuberances preferably are in the extension of a single component sheet of the glass partition or of a single group of such adjacent sheets. In other words, the protuberances are located perceptibly in alignment in a single position with respect to the thickness of the glass partition.

This characteristic facilitates the construction of the frames for windows or the associated bodies, by allowing the insertion of the protuberances in a single standard fillister.

Other characteristics and advantages of the invention will become evident in the light of the following description of the attached drawings, in which FIGS. 1 to 4 respectively are schematic representations of four different embodiments of the invention.

The glass panel of FIG. 1 is composed, from the outside—that is from the side at which the impact is likely to occur—toward the inside:

of a vitroceramic sheet 1, 6 mm in thickness, of an interpolated adhesive layer 2 of polyvinylbutyral (PVB), 3 mm in thickness, of a sheet of glass 4 of an interpolated adhesive layer 5 of PVB, of a sheet of glass 6, of an interpolated adhesive layer 7 of polyurethane (PU), and of a sheet 8 of polycarbonate (PC) the inner surface of which generally is coated with streak-resistant, for example polysiloxane-based lacquer, over a thickness equal at the very most to 15 $\mu$m, but more often on the order of 2 to 7 $\mu$m.

The sheet 8 also is coated, in whole or in part, as need be, with a coloring layer in particular following an upper horizontal strip, or with any other functional layer customarily applied on the inner surface of a windshield.

The stratified armor structure, composed of sheets and layers 4, 5, 6, 7 and 8, has a thickness ranging approximately between 30 and 40 mm. In addition, one may consider interpolating, between sheet 6 and layer 7, successively from the first to the second, one or several stacks consisting, in order, of a PVB layer then a sheet of glass. The thickness of the glass partition thereby is increased proportionally; preferably, the number of sheets of glass contained in this stack of alternating sheets of glass and PVB layers, with outer glass sheets, shall not exceed 4 at the very most, or in particular 3.

In the bulletproofing and shatterproofing application of the invention, the use of hardened glass, that is, glass having been subjected to a thermal hardening treatment, is avoided because of its tendency to break into many small-sized splinters on the first impact of a bullet. The sheets of glass here are composed of annealed glass or chemically reinforced glass which advantageously are damaged only locally after having sustained a bullet impact.

The outer sheet 1 of the glass partition also could consist of annealed glass or chemically reinforced glass, its thickness being equivalent to that of the vitroceramic sheet 1 of FIG. 1.

All the sheets and layers making up the glass partition are, of course, transparent.

According to a first principal embodiment of the invention, represented in FIGS. 1 and 2, at least one of the protuberances consists of a metal insert 3 of stainless steel penetrating into the laminated glass partition to an approximate depth of some fifteen millimeters and emerging by about the same amount.

In accordance with FIG. 1, insert 3 is located in the extension of layer 2; its thickness also is 3 mm.

FIG. 2 represents a variant of the same embodiment in which insert 3, identical to that which has just been described, is located in the extension of sheet 2, made of vitroceramics or, possibly, of annealed or chemically reinforced glass. Insert 3 also emerges from the laminated structure by some fifteen millimeters.

Insert 3, however, is not represented here in direct contact with sheet 2 made of vitroceramics or glass, but slightly separated. As insert 3 and sheet 4 are partially countersunk in the case of one, and almost completely in the case of the other, in an adhesive layer 9 made of PVB, the latter, in the course of manufacture of the glass partition, will be likely to creep, including into the space left unoccupied between insert 3 and sheet 2. It is possible, however, to limit this unoccupied space to the point of eliminating it, the adhesive layer 9 then being replaced by two independent layers. By way of comparison, it is noted that the creep of the PVB in layer 2 of FIG. 1 is limited by a side of sheet 1, the edge of insert 3 and a side of sheet 4, possibly to some minor, negligible seepages at the sheet 1-insert 3 and insert 3-sheet 4 interfaces.

The second principal embodiment is represented in FIG. 3. The glass partition represented is distinguished essentially from that of FIG. 2 in that at least one rigid protuberance is formed by the emerging portion of a continuous sheet 2 made of glass or vitroceramics, in particular of chemically reinforced glass, with an area in excess of that of the other sheets making up the glass partition.

Sheet 2 is completely covered, except for its lower edge, in an adhesive layer 9 of polyurethane (PU). Under these circumstances, the creeping of the PU may be utilized during the construction of the laminate. When sheet 2 is made of chemically reinforced glass, it is strongly recommended to protect the emerging portion thereof, considering its susceptibility to scratching. In order to do so, after manufacture of the sheet, an encapsulation of the emerging portion of the exposed sheet 2 in a film of suitable plastic also may be implemented.

According to an embodiment represented in simplified form in FIG. 4, a glass partition is made up of an outer sheet or a stack of sheets 10 and an inner stack of sheets 11. The stack has an area less than that of the sheet or stack 10, so that the periphery of the second extends uniformly beyond that of the first.

The sheet or stack 10 is duly made up of a sheet of chemically reinforced glass, while stack 11 is of the type described previously in relation to FIGS. 1 to 3.

A peripheral metal belt 12 is joined at one and the same time to the sheet or stack 10 and to the stack 11, in the manner represented in the Figure; a joining by gluing may be considered.

This type of configuration achieves excellent bulletproof and shatterproof properties. The whole constituted by the edge of the sheet or stack 10 and the belt 12 may be inserted into the fillister of an opening or simply positioned supported and more or less nested in relation to the structure of this opening directed outward, according to the shapes of openings used.

Although the bulletproof and/or shatterproof glass partitions of the invention are suitable for the building trade as well as for all transport vehicles, the glass partitions for road-transport vehicles, and specifically fixed or in particular movable lateral glass partitions for private armored vehicles, are especially contemplated.

Advantageously, the rigid protuberance or protuberances has/have a thickness equivalent to that of a conventional glass partition for an automotive vehicle, and thus easily are inserted into the fillister instead of a conventional glass partition.

In the case of a glass partition which is movable, generally in the vertical direction, the problem of susceptibility to scratching of a protuberance made of chemically reinforced glass, necessitating its covering or encapsulation, derives precisely from these back-and-forth movements, producing friction in the fillister.

According to another advantageous characteristic, the outer surface of the glass partition is placed exactly in the continuity of the body. The aerodynamic characteristics of the vehicle thereby are improved, in known manner, through a decrease in its coefficient of penetration in air.

The glass partition of the invention is distinguished in particular in the sense that the holding of the glass partition in the fillister continues to be ensured, to a great extent, after the first impact, so that a resistance to a second impact, or even to a subsequent impact, may be achieved, according to the laminated structures used, the nature of the projectiles and the force of firing. By comparison with known armored glass partitions, that of the invention withstands heavier projectiles, more forceful and more numerous impacts, whether simultaneous or consecutive.

What is claimed is:

1. An armored transparent partition, comprising:

a substantially planar laminated transparent element having at least two transparent layers extending substantially in the plane of said transparent element, wherein said at least two layers comprise two sheets of glass and an interpolated adhesive layer; and at least one rigid protuberance fixed to at least one of said layers and extending, substantially in the plane of said transparent element, beyond a periphery of at least one of said layers, wherein said at least one rigid protuberance comprises a metal insert is mounted between said two sheets of glass and forms an extension of said adhesive layer, said at least one rigid protuberance extending in the plane of the interpolated adhesive layer and having a width substantially the same as a width of the interpolated adhesive layer.

2. The armored transparent partition of claim 1, wherein said at least one rigid protuberance comprises a metal insert extending between said layers.

3. The armored transparent partition of claim 1, wherein said interpolated adhesive layer is a polyvinylbutyral layer.

4. An armored transparent partition, comprising:

a substantially planar laminated transparent element having at least two transparent layers extending substantially in the plane of said transparent element; and at least one rigid protuberance fixed to at least one of said layers and extending, substantially in the plane of said transparent element, beyond a periphery of at least one of said layers, wherein said at least two layers comprise, in order, a first sheet of glass, a first polyvinylbutyral adhesive layer, a second sheet of glass, a second polyvinylbutyral adhesive layer, a third sheet of glass, a polyurethane adhesive layer, and a polycarbonate layer, and wherein said at least one rigid protuberance extends between said first and second sheets of glass, and forms an extension of said first polyvinylbutyral adhesive layer.

* * * * *